April 15, 1924.
H. A. PEDRICK
FEED GEARING
Filed Oct. 27, 1920
1,490,783
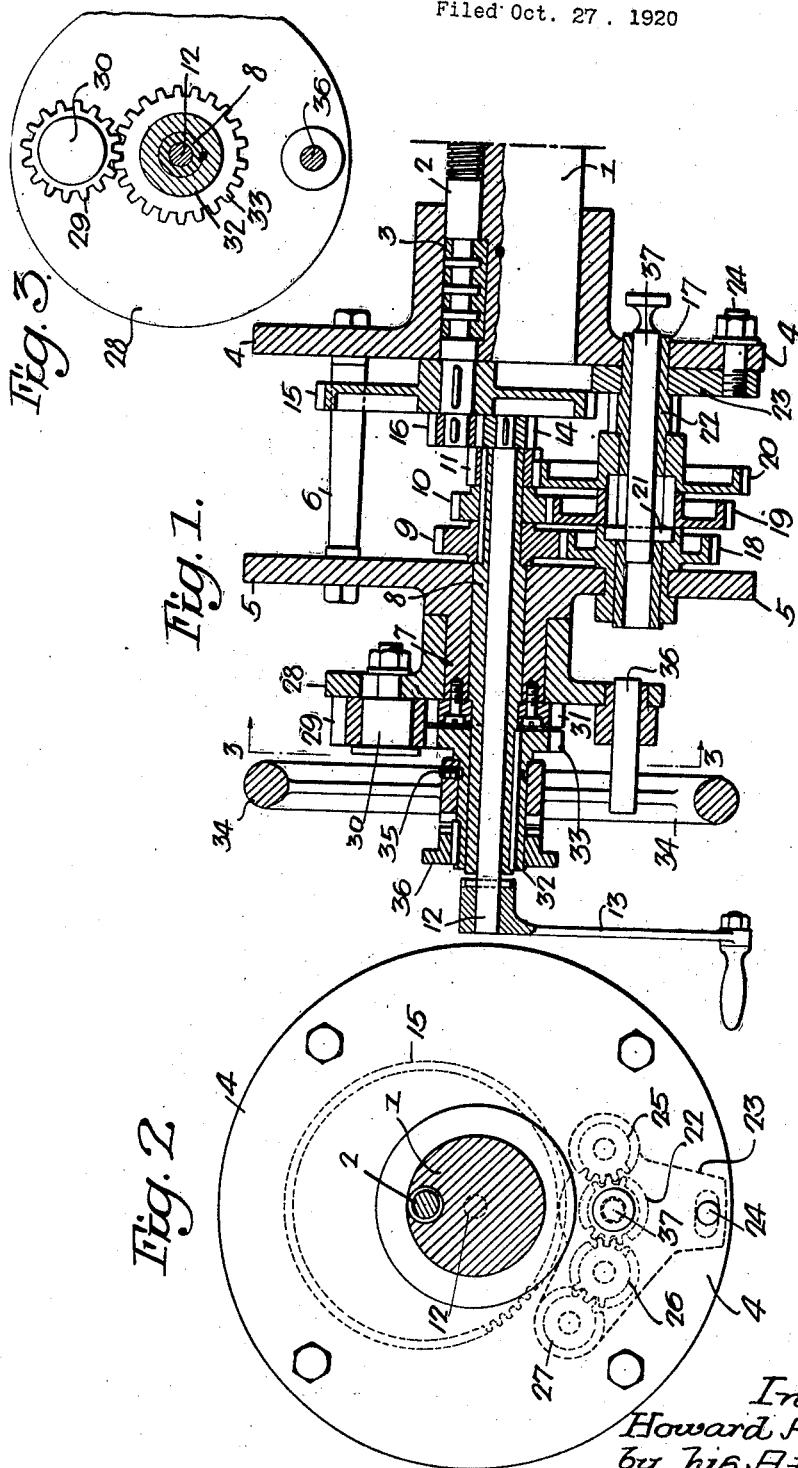

Patented Apr. 15, 1924.

1,490,783

UNITED STATES PATENT OFFICE.

HOWARD A. PEDRICK, OF BALA, PENNSYLVANIA, ASSIGNOR TO HOWARD A. PEDRICK AND ALBERT D. PEDRICK, COPARTNERS TRADING AS PEDRICK TOOL AND MACHINE COMPANY.

FEED GEARING.

Application filed October 27, 1920. Serial No. 419,900.

*To all whom it may concern:*

Be it known that I, HOWARD A. PEDRICK, a citizen of the United States, residing in Bala, Montgomery County, Pennsylvania, have invented Feed Gearing, of which the following is a specification.

This invention relates to mechanism for controlling the rate of feed of a cutting tool or equivalent device and more especially a tool carried by a supporting structure such as a rotary boring bar.

One object of said invention is to provide a novel form of feed gearing particularly designed to permit of a quick and convenient adjustment whereby a cutting tool may be caused to feed at a relatively slow rate such as is required when using a drill to bore a hole in solid material or to feed at a faster rate as when it is operating on the inside surface of a previously formed hollow structure.

Another object of the invention is to provide a device of the above character which shall be substantial in construction, not likely to get out of order and of such a nature that it may be readily applied to apparatus already in use without requiring serious alteration thereof.

These objects and other advantageous ends I attain as hereinafter set forth, reference being had to the accompanying drawings, in which, Fig. 1 is a longitudinal vertical section of one end of a boring bar with gearing constructed and arranged in accordance with my invention, for controlling the operation of a cutting tool;

Fig. 2 is an end elevation further illustrating my invention, and

Fig. 3 is a vertical section on the line 3—3, Fig. 1.

In the above drawings, 1 represents a boring bar formed with a longitudinally extending slot or groove in which is mounted a feed screw 2 having supporting bearings of which one is indicated at 3 and threaded through a holder in which is mounted a cutting or other form of tool designed to be moved longitudinally of the bar 1 by rotation of said screw, in the manner set forth in the patent granted to me #1,230,020, dated June 12, 1917.

Mounted on and fixed to one end of the bar 1 is a plate or disc 4 rigidly connected to and supporting a second plate 5 by a series of posts 6. This latter plate is formed with a hub 7 concentric with the boring bar 1 and in this hub is mounted a tubular spindle 8 having keyed to it between the plates 4 and 5, a series of spur gears 9, 10 and 11. Said spindle is extended beyond the hub 7 and has mounted concentrically within it a shaft 12 whose outer end is adapted to removably receive a crank handle 13 and whose opposite end has keyed to it a gear 14.

The end of the feed screw 2 projects between the plates 4 and 5 and has keyed to it a relatively large gear 15 and a smaller gear 16, of which the latter lies in the same plane as and meshes with the gear 14. Journalled in the two plates 4 and 5 eccentrically with but parallel to the boring bar 1 is a tubular spindle 17 having loosely mounted upon it three gears 18, 19 and 20, permanently in engagement with the gears 9, 10 and 11 respectively.

By means of a key 21 however, any one of the gears 18, 19 and 20 may be operatively connected to the spindle 17 which in the present instance is integral with a gear 22 lying adjacent a plate 23 adjustably connected to the plate 4 by a pivot member 24. Said plate has also rotatably mounted upon it two gears 25 and 26 permanently in mesh with the gear 22, and of these said gear 26 is also permanently in mesh with a gear 27 also carried by the plate 23;—the arrangement being such that said plate may be moved into a position in which the gear 27 meshes with the gear 15, or into a position in which the latter meshes with the gear 25. It may also be moved into an intermediate position in which both of the gears 25 and 27 are clear of the gear 15.

In accordance with my invention the hub 7 of the plate 5 has rotatably mounted upon it a plate 28 on whose outer face is rotatably mounted a spur gear 29 rotatably carried upon a pin 30 clamped in a radial slot so as to be adjustable toward and from the spindle 12. In the present instance the outer face of the plate 28 and the outer end of the hub 7 are in the same radial plane and to said hub end is fixed a gear 31 whose teeth may be engaged by those of the gear 29 when the pin 30 is moved to its innermost position in its slot.

The outer end of the tubular spindle 8 has keyed to it a sleeve 32 having mounted on its inner end, in the present instance integrally, a gear 33 lying immediately adjacent the gear 31 and capable of being simultaneously engaged with the teeth of the gear 29. It is to be noted however that one of the gears 31 or 33 is made with one tooth more than the other and the sleeve 32 has rotatably mounted upon it the hub of a hand wheel 34 held in position by a set screw 35 which enters an annular groove formed in the external surface of said sleeve.

The outer face of the hub of the hand wheel 34 is formed with a suitable number of clutch teeth designed to coact with a similar set of clutch teeth on the adjacent face of a sliding clutch ring 36 splined to said sleeve. The plate 28 has projecting from it a pin or arm 36 so placed as to extend between the spokes of the hand wheel 34 and cause it to rotate with said plate.

For shifting the position of the key 21, I mount within the spindle 22 a longitudinally slidable bar 37 one of whose ends is formed with a handle to permit of its convenient operation, while its other end is engaged by the key 21 so that at will it may be moved longitudinally of said spindle and caused to connect to it any one of the gears 18, 19 or 20.

With the above described arrangement of parts the boring bar 1 is rotated by power applied by suitable means (not shown) and with it all of the mechanism above described is likewise rotated. If now it is desired that the tool shall be used with a drill it is essential that it be fed at a relatively slow rate, and in accordance with my invention this end may be attained by the operator holding the wheel 34 so as to prevent its revolution. By this means the plate 28 through the pin 36 is also held from turning, while the plates 4 and 5 with the hub 7 and gear 31 rotate with the bar. As a result, said latter gear turns the gear 29 on its spindle 30, and each revolution of the plate 28 causes the gear 33 to turn relatively to the gear 31 to an extent equal to the width of one tooth.

Since this gear 33 is integral with the sleeve 32 and since the latter is keyed to the tubular shaft 8, said shaft is correspondingly turned relatively to the rotating system and more especially to the boring bar 1 so that, for example, if the key 21 be in the position shown, power is transmitted from the gear 9 to the gear 18, thence through the sleeve or tubular shaft 17 to the gear 22, and if the tool is to be fed away from the mechanism on the end of the boring bar, through the gear 25 to the gear 15. The turning of the latter results in a turning of the screw 2 and a movement of the tool thereon longitudinally of the boring bar.

Obviously if it be desired to feed said tool 1 at a slower rate, this may be accomplished by shifting the position of the key 21 by means of the headed rod 37 so that power is transmitted from the tubular shaft 8 through the gears 10—19 or 11—20. Furthermore, if it be desired that the tool be fed by the screw 2 toward the above described apparatus instead of from it, the plate 23 is so adjusted on its supporting structure as to disengage the gear 25 from and engage the gear 27 with the gear 15.

If on the other hand, it is desirable to feed the cutting tool at a higher rate of speed than would be possible with the above described combination of gearing, as for example when it is cutting out or finishing a previously formed hole, the clutch member 36 may be moved inwardly on the sleeve 32 so as to directly connect the hub of the hand wheel 34 with said sleeve. Under these conditions therefore when the hand wheel 34 is held from rotation, the sleeve 32 and also the tubular shaft 8 are likewise held, as are also the gears 9, 10 and 11. Since however the gears 18, 19 and 20 are rotated with the boring bar 1 and the plates 4 and 5, that one of said latter gears engaged by the key 21 is caused to rotate its supporting shaft 17 with the gear 22, and that one of the gears 25 or 27 which is in engagement with the larger gear 15 on the screw shaft 2, with the result that the latter is turned at a relatively higher speed than before.

At any time I may slack off the nut holding the pin 30 in its inner position and permit the gear 29 to disengage the two gears 31 and 33. Under these conditions the hand wheel may be coupled by the member 36 to the sleeve 32 and spindle 8 so that this latter and the feed screw may be adjusted by hand in either direction.

For moving the screw 2 with the tool at a still higher rate of speed, I provide the handle 13 which through the spindle 12 and gears 14 and 16, will turn said screw at the same rate as said handle is turned.

From the above description it will be appreciated that my device provides convenient means whereby a boring tool may be moved at any of a number of speeds, depending upon the nature of the work to be done, and is not only convenient to adjust and operate but is relatively simple and compact.

I claim:—

1. The combination of a rotary boring bar; a gear driven thereby; a feed screw; a spindle connected to said feed screw; a second gear on the spindle having a number of teeth different from that of the first gear; a third gear meshing with the two first gears and mounted to move bodily: with means for holding the third gear from bodily movement to cause rotation of the first gear by the boring bar to turn the second gear and the feed screw.

2. The combination of a rotary boring bar; a hub supported by and rotatable with said bar; a plate rotatable on the hub; a gear carried by the plate eccentrically to the hub; a rotary spindle supported by the hub; a feed screw for the boring bar driven from said spindle; a hand wheel supported by the spindle and connected to the plate to cause simultaneous rotation thereof; with a second and a third gear respectively fixed to the spindle and to the hub and both meshing with the first gear.

3. The combination of a rotary boring bar; a hub supported by and rotatable with said bar; a plate rotatable on the hub; a gear carried by the plate eccentrically to the hub; a rotary spindle supported by the hub; a feed screw for the boring bar driven from said spindle; a hand wheel supported by the spindle and connected to the plate to cause simultaneous rotation thereof; a second and a third gear respectively fixed to the spindle and to the hub and both meshing with the first gear; with means for clutching the hand wheel to the second gear wheel at will.

4. The combination of a rotary boring bar; a hub supported by and rotatable with said bar; a plate rotatably mounted on the hub; a gear eccentrically mounted on the plate; a spindle rotatably supported by the hub; a feed screw mounted on the boring bar; change speed gearing connecting said spindle with the feed screw; a second gear fixed to the hub and meshing with the plate-carried gear; a third gear fixed to the spindle immediately adjacent said second gear and also meshing with the first gear, said third gear having a number of teeth different from that of the second gear; and a rotatably mounted hand wheel fixed to the plate for holding it from turning.

5. The combination of a rotary boring bar; a hub supported by and rotatable with said bar; a plate rotatably mounted on the hub; a gear eccentrically mounted on the plate; a spindle rotatably supported by the hub; a feed screw mounted on the boring bar; change speed gearing connecting said spindle with the feed screw; a second gear fixed to the hub and meshing with the plate-carried gear; a third gear fixed to the spindle immediately adjacent said second gear and also meshing with the first gear, said third gear having a number of teeth different from that of the second gear; and a rotatably mounted hand wheel fixed to the plate for holding it from turning, the first gear wheel being adjustable to disengage the second and third gear wheels at will.

6. The combination of a rotary boring bar; a hub supported by and rotatable with said bar; a plate rotatably mounted on the hub; a gear eccentrically mounted on the plate; a spindle rotatably supported by the hub; a feed screw mounted on the boring bar; change speed gearing connecting said spindle with the feed screw; a second gear fixed to the hub and meshing with the plate-carried gear; a third gear fixed to the spindle immediately adjacent said second gear and also meshing with the first gear, said third gear having a number of teeth different from that of the second gear; a rotatably mounted hand wheel fixed to the plate for holding it from turning; with a clutch for connecting the hand wheel and the third gear at will.

7. The combination of a rotary boring bar; a hub fixed thereto; a plate rotatable on the hub; a relatively broad faced gear carried by said plate eccentrically to the hub; a spindle rotatably mounted in the hub; a feed screw for the boring bar; a gearing connecting said spindle with the feed screw; two relatively narrow faced gears meshing with said plate-carried gear and respectively fixed to the hub and to the spindle, the latter of said gears having an extended sleeve portion; a hand wheel rotatably mounted on the sleeve portion and having a toothed face; a clutch member slidably mounted on said sleeve portion for directly connecting said hand wheel thereto; and means carried by the plate for causing it to turn with the hand wheel.

8. The combination of a rotary boring bar; a feed screw mounted therein; a hub supported by said boring bar; a tubular spindle rotatably mounted in said hub; a second spindle mounted in said tubular spindle; gearing directly connecting said second spindle and the feed screw; change speed gearing connecting the tubular spindle and the feed screw; a hand operated member supported by the hub; and two devices for causing said feed screw to be turned at two different speeds from said tubular spindle when said member is held from turning.

9. The combination of a rotary boring bar; a tool feed screw mounted therein; a hub supported by the boring bar to turn therewith; a spindle mounted in the hub; a hand wheel supported by the hub; gearing for causing relatively slow movement of the spindle and feed screw when the hand wheel is held from turning and the boring bar is rotated; with a clutch for directly connecting said spindle and hand wheel to cause a relatively faster movement of the feed screw when said wheel is held from turning.

10. The combination of a rotary boring bar; a tool feeding screw mounted therein; a hub supported by said boring bar; two concentric spindles rotatably carried by said hub; gearing directly connecting one of the spindles with the feed screw; change speed gearing connecting the second spindle with the feed screw; a hand wheel; and two devices associated with the hand wheel for turning the feed screw from the second spindle at two different speeds when said wheel is held from turning when the boring bar is turned.

11. The combination of a rotary boring bar; a tool feeding screw mounted therein;

a hub supported by said boring bar; two concentric spindles rotatably carried by said hub; gearing directly connecting one of the spindles with the feed screw; change speed gearing connecting the second spindle with the feed screw; a hand wheel; a clutch for directly connecting the second spindle to the hand wheel; and three gears of which one is rotatable bodily with the hand wheel and the two other gears meshing with the first gear and respectively fixed to the hub and to the second spindle.

HOWARD A. PEDRICK.